United States Patent
McWilliams

(10) Patent No.: US 9,456,593 B2
(45) Date of Patent: Oct. 4, 2016

(54) FISHING LURE WITH A BUILT-IN, SPRING-LOADED, ADJUSTABLE DIVING AND RELEASE APPARATUS

(71) Applicant: Shannon Patrick McWilliams, Tallahassee, FL (US)

(72) Inventor: Shannon Patrick McWilliams, Tallahassee, FL (US)

( * ) Notice: Subject to any disclaimer, the term of this patent is extended or adjusted under 35 U.S.C. 154(b) by 111 days.

(21) Appl. No.: 14/290,525

(22) Filed: May 29, 2014

(65) Prior Publication Data
US 2015/0342166 A1 Dec. 3, 2015

(51) Int. Cl.
*A01K 85/16* (2006.01)

(52) U.S. Cl.
CPC ..................... *A01K 85/16* (2013.01)

(58) Field of Classification Search
CPC ....... A01K 85/00; A01K 85/16; A01K 85/18
USPC ...... 43/42, 42.02, 42.04, 42.22, 42.23, 43.1, 43/43.14, 44.92, 44.95
See application file for complete search history.

(56) References Cited

U.S. PATENT DOCUMENTS

| | | | | | |
|---|---|---|---|---|---|
| 2,608,016 A | * | 8/1952 | Shipley | ............. | A01K 85/16 43/42.03 |
| 2,976,642 A | * | 3/1961 | Wickman | ............. | A01K 93/00 43/42.04 |
| 3,643,370 A | * | 2/1972 | Cook | ............. | A01K 95/00 43/43.12 |
| 5,339,561 A | * | 8/1994 | Weber | ............. | A01K 91/08 43/43.13 |
| 2011/0107653 A1 | * | 5/2011 | Tsai | ............. | A01K 85/02 43/35 |
| 2011/0252691 A1 | * | 10/2011 | Heyne | ............. | A01K 91/08 43/43.13 |
| 2011/0258906 A1 | * | 10/2011 | Ford | ............. | A01K 85/16 43/42.23 |
| 2013/0305587 A1 | * | 11/2013 | Takahashi | ............. | A01K 85/16 43/42.49 |

* cited by examiner

*Primary Examiner* — Lisa Tsang
(74) *Attorney, Agent, or Firm* — Garrett James O'Sullivan; Timothy Marc Shropshire; MU Patents

(57) ABSTRACT

A fishing lure with a spring-loaded, adjustable diving and release apparatus built in to the diving bill that allows the elimination of the diving plane when certain release events occur that would cause a disengagement of the apparatus built into the diving bill. The events that would cause this release to occur would be, but are limited to, 1) the fisherman jerking the line to cause the release in order to retrieve the fishing lure with relative ease while trolling said fishing lure behind a moving boat, 2) a fish strike that would then create a direct line to fish connection, eliminating any pressure points the diving bill might create allowing the fish to work itself free of the hooks, and 3) striking an obstruction on the bottom of the water column that might otherwise cause the fishing lure to snag or entangle in the obstruction.

4 Claims, 4 Drawing Sheets

FISHING LURE WITH A BUILT-IN, SPRING-LOADED, ADJUSTABLE DIVING AND RELEASE APPARATUS

FIELD OF INVENTION

The invention is within the field of apparatus for fishing. Specifically the invention is a hydrodynamic fishing lure of the diving type when pulled behind a moving boat, or trolled.

BACKGROUND OF THE INVENTION

Certain species of game fish prefer to feed below the water's surface at different depths within the water column. For decades, fishermen have employed the use of diving lures that will plane down to a particular depth and attract these types of game fish. The attachment of a fixed diving bill to the front of any shaped diving lure will create a diving plane when the line is attached at a point behind the leading edge of the diving bill and pulled by a boat or cranked with a reel through the water. The water flowing from the front to back of the lure and moving over the diving bill creates downward pressure on the diving bill, causing the lure to dive.

This method becomes significantly less manageable for the fisherman as lure sizes for very large game have increased over time. This phenomenon is pronounced in saltwater fishing where the game fish are exponentially larger than fresh water species and the commonly used fishing lure sizes have grown in size commensurate with their target prey.

Large diving lures with fixed diving bills, sometimes pulled at speeds of 5 to 7 knots, create a tremendous amount of hydrodynamic pressure against the diving bill in order to cause the lure to dive to depths of 25 to 50 feet below the surface. This pressure on the lure diving at these depths when trolled with fishing rods and reels and connected to the fishing line create three very specific problems for the fisherman.

1. The diving fishing lures are very difficult to retrieve by reeling them back to the boat while the boat is still trolling at these speeds. Many times, there is more than one lure being trolled behind the boat, so stopping the boat to more easily retrieve the lure is not a good solution. The other lures and attached fishing lines can become tangled while the boat is stopped.
 2. Once an actual game fish has struck the lure and is hooked in some nature on the attached hooks, the fish can use the water pressure on the lure to work itself free of the hook. A direct line to fish connection has the best probability of keeping the hook lodged in the fish's mouth. The water pressure on a fixed diving bill, even while a fish is hooked on one of its hooks, inhibits a direct line to fish connection and can cause the fisherman to lose the fish.
 3. The diving lures are sometimes trolled very close to the bottom of the water column, near obstructions and objects on the bottom that are habitat for large game fish and their natural food sources. If the diving lure encounters an obstruction in its path, it will strike it and continue to dive, striking it over and over again, potentially becoming snared by its own hooks on the obstruction.

In addition to these specific problems, there eventually comes a point where the combination of the size of the lure, and the pressure it generates when trolled behind the boat creates an actual limitation to how far a diving lure can be engineered to dive. It is at this point a diving lure becomes impractical to fish with. The largest diving lures with fixed diving bills available today have essentially reached that limitation.

The present invention art depicts an apparatus built within the diving bill, which allows the diving plane to be eliminated. By eliminating the diving plane with the built-in, spring-loaded, adjustable release apparatus in the diving bill, it solves the three issues created by a fixed diving bill, and helps to solve the broader limitation of how large and how deep a lure can be engineered to dive. The spring-loaded and adjustable features of this apparatus are critical to its operation, since trolling speeds for various species of fish can vary, causing the relative pressure on the lure to vary. The optimal adjusted setting of the present invention apparatus will allow the lure to travel through the water in a diving position, but be released by one of three events:

The fisherman triggers the release through a jerk of the line attached to the lure
 A fish strikes the lure and becomes hooked, or
 The diving lure strikes structure on the bottom of the water.

SUMMARY OF THE INVENTION

A fishing lure with a built-in, spring-loaded, adjustable diving and release apparatus allows the elimination of the diving plane when certain events occur that would cause a release of the apparatus built into the diving bill. The events that would cause this release to occur would be, but are limited to, 1) the fisherman jerking the line to cause the release in order to retrieve the fishing lure with relative ease while trolling said fishing lure behind a moving boat, 2) a fish strike that would then create a direct line to fish connection, eliminating any pressure points the diving bill might create allowing the fish to work itself free of the hooks, and 3) striking an obstruction on the bottom of the water column that might otherwise cause the fishing lure to snag or entangle in the obstruction.

The present fishing lure invention has an oblong shaped body that imitates the shape of a live fish that would be prey for larger game fish. The fishing lure has a first and second end portions, with a diving bill protruding from the first end portion angled downwardly along the longitudinal axis of the lure body and improved to house the spring-loaded, adjustable diving and release apparatus. The diving bill has a top surface that defines the diving plane, a rounded and cylinder shaped surface below, a rear end that attaches to first portion of the fishing lure body, and front end that defines the leading edge of the fishing lure when pulled through the water. A slot exactly bisecting the diving bill along its longitudinal axis, starting near the leading edge of the diving bill and extending nearly the full length of the diving bill to its rear end. A release hook is pivotably mounted near the front end of the diving bill within the slot for fore and aft movement relative to the diving bill. The hook-shaped end of the release hook, as well as the entire length of the release hook rests completely within the slot when in the engaged position, so that it's top surface rests flush with the top surface of the diving bill, with the exception of an eyelet that protrudes from the top of the release hook for attachment to the fishing line. The release hook in the engaged position is held in place by the spring-loaded, adjustable diving and release apparatus, which is housed in a cylinder shaped cavity which begins with a round opening in the front of the rounded and cylinder shaped surface on the underside of the diving bill. This cavity extends towards the rear end of the diving bill at a slightly upward angle relative to the top surface of the diving bill, until it intersects the rear end of the slot near the rear portion of the diving bill. Within the cylinder shaped cavity is a ball with a smooth surface, a spring to put adjustable pressure on the ball, a set screw to adjust the pressure on the spring and a threaded insert that matches the threads on the set screw and affixed to the open end of the cylinder-shaped cavity at the front of the cylinder shaped surface on the underside of the diving bill. The hook-shaped rear end of the release hook and ball intersect each other and create a catch with adjustable pressure to hold the release hook in the engaged position. The rounded shape of the hook shaped end of the release hook is pushed down on top of the ball, pushing the ball toward the front of the cylinder shaped cavity, until the hook snaps into place over the ball, which then fills the hook shaped end of the release hook. This represents the engaged position. In a similar fashion, when a release event pulls the release hook upward and forward, the rounded shape of the hook shaped end of the release hook pushes the ball against the spring toward the front of the cylinder shaped cavity until the hook shaped end clears the ball compressed against the spring and is disengaged from the catch apparatus.

The most important design feature of this apparatus is the adjustable nature of the tension on the spring. The set screw adjusts the tension on the spring, compressing it against the ball which holds the release hook in the engaged position. For faster trolling speeds, more tension is required to hold the release hook in the engaged position, but just enough tension so that a fisherman, a fish, or an obstruction that is struck can disengage the release hook from its position, allowing the release hook to swing up and forward toward the front of the diving bill.

The engaged position, when fishing line attached to the eyelet on the top of the release hook extending above the top surface of the diving bill, creates a diving plane when pulled through the water by a moving boat, causing the entire fishing lure device to dive below the surface of the water. When the release hook is disengaged from its engaged position, the release hook swings toward the fore position, pivoting around its mounted position near the front end of the diving bill, thereby eliminating the diving plane, thereby causing the lure to stop diving and begin ascending toward the surface of the water, or retrieved more easily by the fisherman.

BRIEF DESCRIPTION OF THE DRAWINGS

In the accompanying drawings that form part of the specifications, and in which like numbers designate like parts throughout.

DETAILED DESCRIPTION OF THE INVENTION

A fishing lure with a built-in, spring-loaded, adjustable diving and release apparatus has a diving bill extending from the front of an oblong shaped lure body angled slightly downwardly from the longitudinal access of the lure body. The diving bill has been improved to house the spring-loaded, adjustable diving and release apparatus. This diving bill with apparatus allows the lure to dive when the release hook is in the engaged position when pulled through the water at various speeds. When disengaged by a release event acting upon the fishing lure, the release hook will disengage, eliminating the diving plane so the fishing lure can return to the surface or be retrieved easily by the fisherman.

Figure 1:
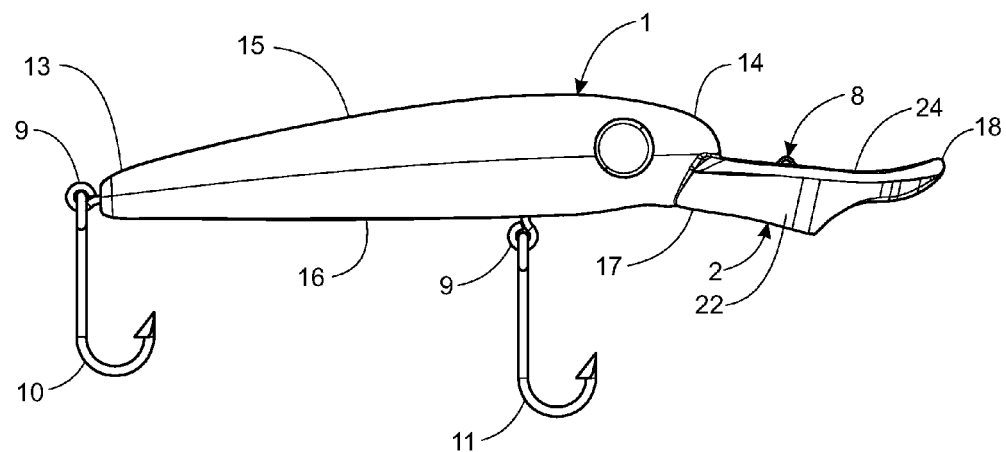
FIG. 1 is a side elevation view of the entire fishing lure device with the release hook in the engaged position at the rear end of the diving bill.

Referring FIG. 1, an oblong fishing lure body 1 is illustrated having a front or head portion 14, a rear or tail portion 13, a top side 15 and a bottom side 16. The diving bill 2 has a top surface 24 that defines the diving plane, a rounded and cylinder shaped surface below 22, a rear end 17 that attaches to front or head portion 14 of the fishing lure body 1, and front end 18 that defines the leading edge of the fishing lure when pulled through the water. A release hook 8 is pivotably mounted near the front end 18 of the diving bill. Eyelets 9 attached to the lure body support a rear fishhook 10 and a second fishhook 11 near the front end 14 of the fishing lure body 1.

Figure 2:
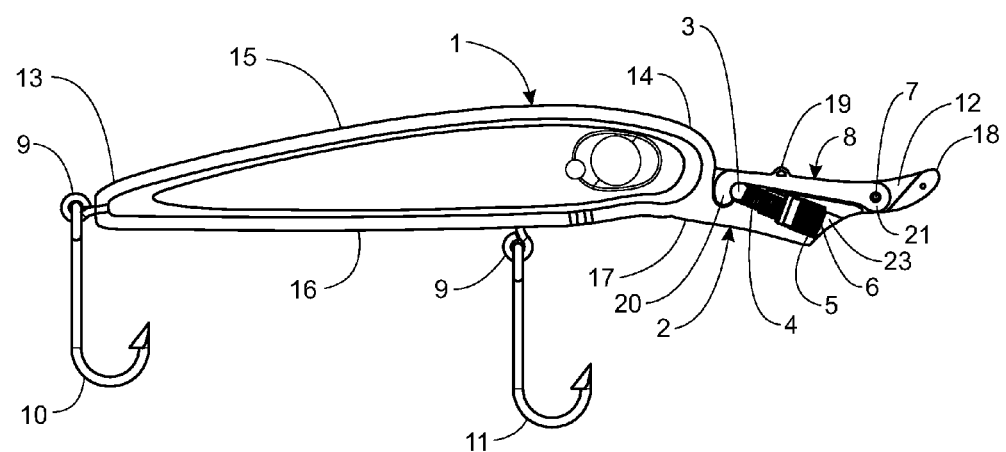
FIG. 2 is a cross sectional view of the entire fishing lure device in FIG. 1 depicting the positioning of the release hook, ball, spring, set screw and threaded insert relative to the diving bill.

Referring to FIG. 2, particularly the diving bill with built-in apparatus, The release hook 8, has a hook-shaped end 20 and a proximal end 21 from which it is pivotably mounted near the front end 18 of the diving bill 2, by a metal pin 7 from which the release hook 8 can move to the fore and aft of the diving bill 2. The release hook 8 in the engaged position rests within a slot 12 that exactly bisects the diving bill 2 from near the front end 18 to the rear end 17. The release hook 8, in the engaged position, is held in place by a ball 3 with pressure supplied by a spring 4 which is compressed by a set screw 6 that rests within a threaded insert 5 with matching thread pattern. This assembly is housed within a cylinder shaped cavity 23 which intersects the slot 12 where the release hook 8 rests in the engaged position. When the release hook 8 is engaged by its hook-shaped end 20 on to the ball 3, the fishing lure will dive when a fishing line is attached to the release hook eyelet 19 and pulled through the water.

Figure 3:
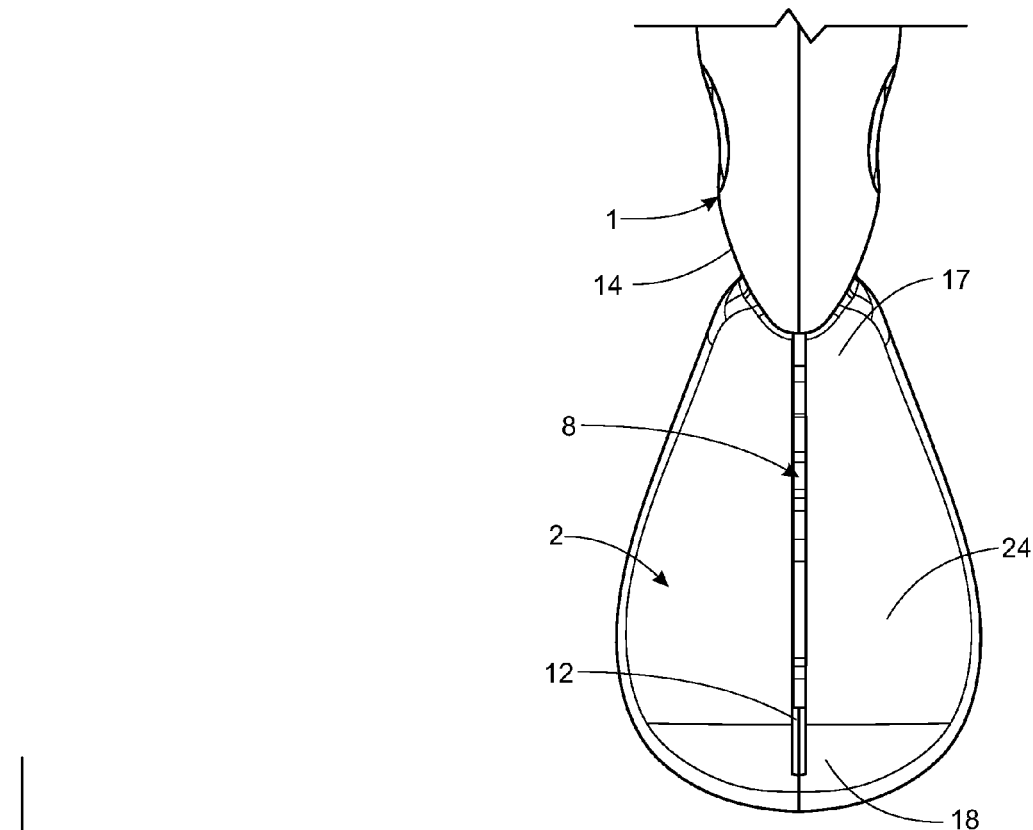
FIG. 3 is a fragmentary top view that illustrates an embodiment that utilizes the slot in the diving bill to house the release hook in the engaged position.

Referring to FIG. 3, in particular a top-view of the diving bill 2, the diving bill 2 has a top surface 24, a front end 18 and a rear end 17 which is attached to the front or head portion 14 of the fishing lure body 1. A slot 12 exactly bisects the diving bill 2 from near the front end 18 to the rear end 17. The release hook 8 rests within the slot 12 and is flush with the top surface 21 of the diving bill 2.

Figure 4:
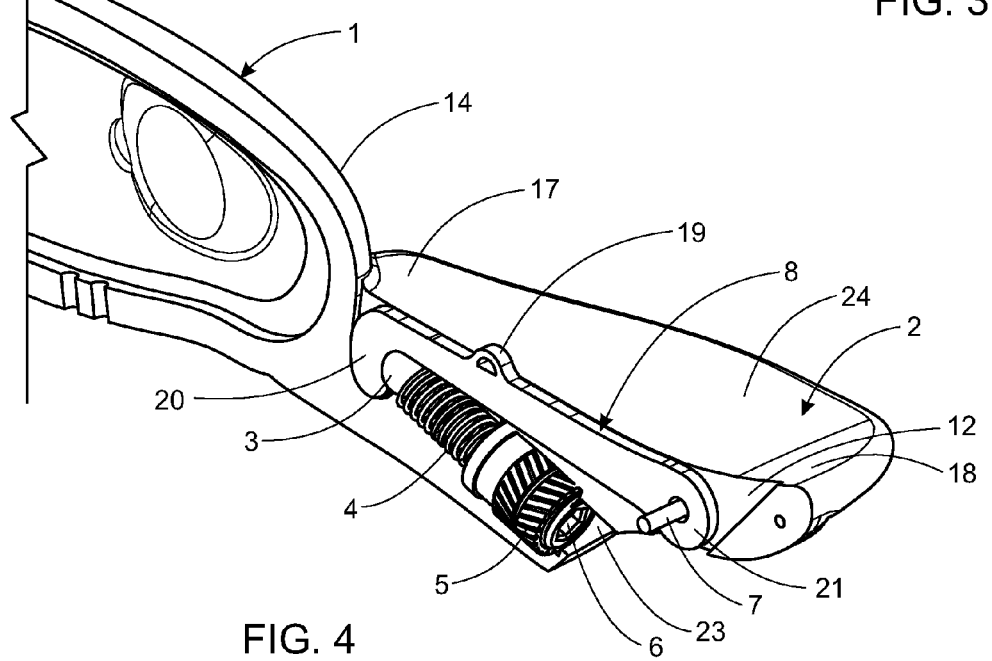
FIG. 4 is a fragmentary perspective view that illustrates an embodiment that utilizes the assembly of ball, spring, set screw and threaded insert to create the catch that engages the release hook when in the engaged position.

Referring to FIG. 4, in particular an fragmentary perspective view of the diving bill 2 in the engaged position, the diving bill 2 has a top surface 24, a front end 18 and a rear end 17 which is attached to the front or head portion 14 of the fishing lure body 1. A slot 12 exactly bisects the diving bill 2 from near the front end 18 to the rear end 17. The release hook 8 rests within the slot 12 and is flush with the top surface 24 of the diving bill 2. The release hook has a hook-shaped end 20, a proximal end 21, a release hook eyelet 19 and is pivotably mounted to the diving bill 2 near the front end 18 by a metal pin 7 from which the release hook 8 can move to the fore and aft of the diving bill 2. The hook-shaped end 20 of the release hook 8, in the engaged position, is held in place by a ball 3 with pressure supplied by a spring 4 which is compressed by a set screw 6 that rests within a threaded insert 5 with matching thread pattern. The set screw 6 allows the adjustment of pressure on the ball 3, through the energy compressed in the spring 4, so that the release pressure can match the speed of the boat pulling the fishing lure through the water, preventing a disengagement of the release hook 8 due only to the pressure of the water pressure on the diving bill 2 instead of an event as described earlier. This assembly is housed within a cylinder shaped cavity 23 which intersects the slot 12 where the release hook 8 rests in the engaged position.

Figure 5:
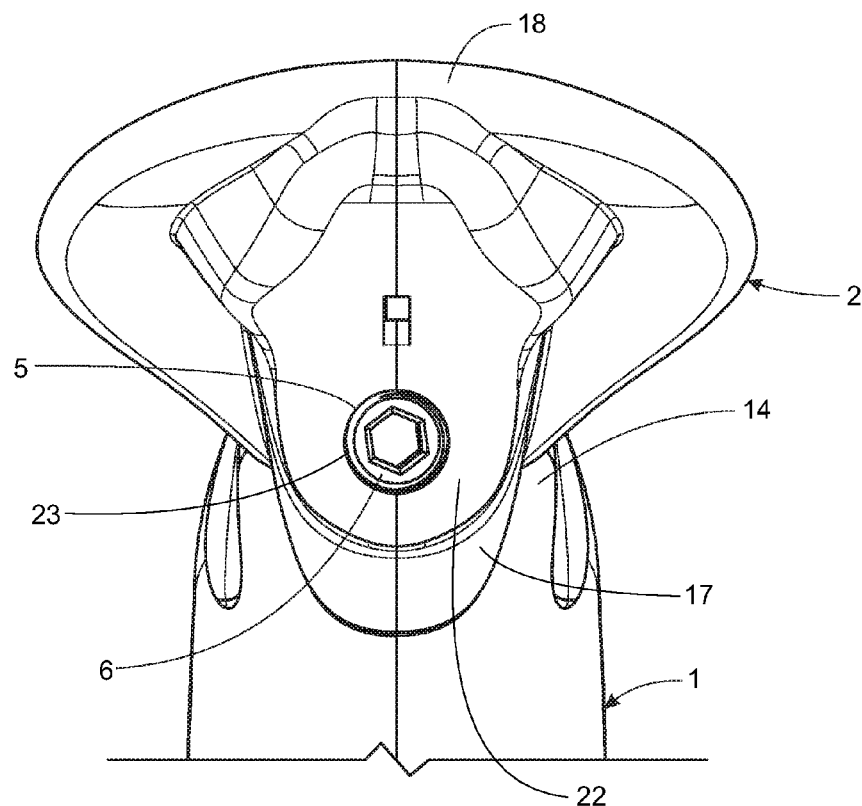
FIG. 5 is a fragmentary front and upward view of the cylinder shaped underside of the diving bill and an embodiment illustrating the positioning of the threaded insert and set screw relative to the cavity within the underside of the diving bill.

Referring to FIG. 5, in particular, a fragmentary front and upward view of the cylinder shaped underside 22 of the diving bill 2, the diving bill 2 has a front end 18 and a rear end 17 attached to the front or head portion 14 of the fishing lure body 1. The cylinder shaped underside 22 of the diving bill 2 has a cylinder shaped cavity 23 in which is attached a threaded insert 5 and a set screw 6.

Figure 6:
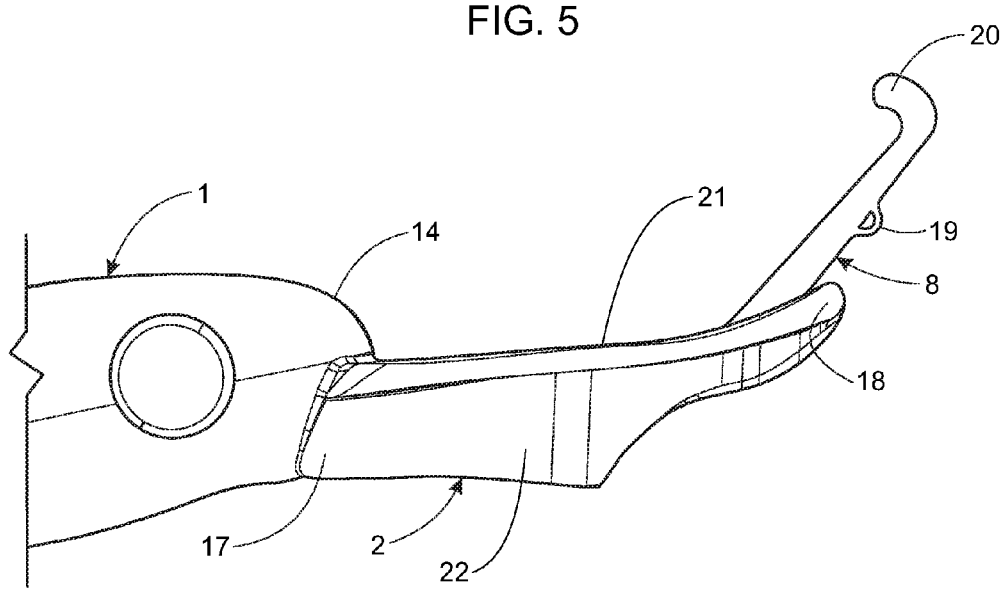
FIG. 6 is a fragmentary side view of the diving bill and release hook in the disengaged position and pivoted toward the front end of the diving bill.

Referring to FIG. 6, in particular an fragmentary side view of the diving bill 2 in the disengaged position, the diving bill 2 has a top surface 21, a cylinder shaped underside 22, a front end 18 and a rear end 17 which is attached to the front or head portion 14 of the fishing lure body 1. The hook shaped end 20 of the release hook 8 is disengaged from its aft position and has pivoted toward the front end 18 of the diving bill 2, eliminating the diving plane created by a fishing line attached to the release hook eyelet 19 and being pulled through the water. Without a diving plane, the lure will return to the surface, will be retrieved by the fisherman more easily, or will eliminate pressure that may allow a fish to work itself free.

Figure 7:
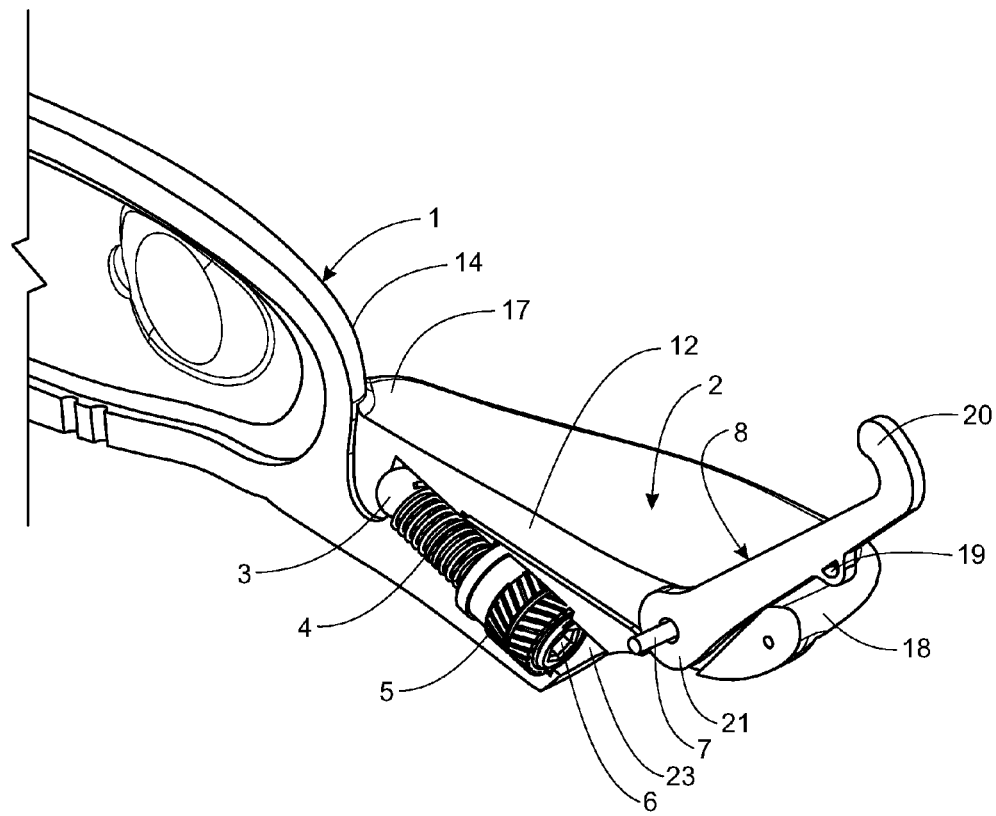
FIG. 7 is a fragmentary perspective view of the diving bill and release hook in the disengaged position and pivoted toward the front end of the diving bill.

Referring to FIG. 7, in particular an fragmentary perspective view of the diving bill 2 in the disengaged position, the diving bill 2 has a top surface 24, a front end 18 and a rear end 17 which is attached to the front or head portion 14 of the fishing lure body 1. A slot 12 exactly bisects the diving bill 2 from near the front end 18 to the rear end 17. The release hook 8 rests within the slot 12 and is flush with the top surface 24 of the diving bill 2. The release hook has a hook-shaped end 20, a proximal end 21, a release hook eyelet 19 and is pivotably mounted to the diving bill 2 near the front end 18 by a metal pin 7 from which the release hook 8 can move to the fore and aft of the diving bill 2. The hook shaped end 20 of the release hook 8 is disengaged the ball 3 and has pivoted toward the front end 18 of the diving bill 2, eliminating the diving plane created by a fishing line attached to the release hook eyelet 19 and being pulled through the water. The energy that held the release hook 8 in place has been released from the ball 3 and spring 4 which is compressed by a set screw 6 that rests within a threaded insert 5 with matching thread pattern. This assembly is housed within a cylinder shaped cavity 23 which intersects the slot 12 when the release hook 8 is held in the engaged position.

Figure 8:
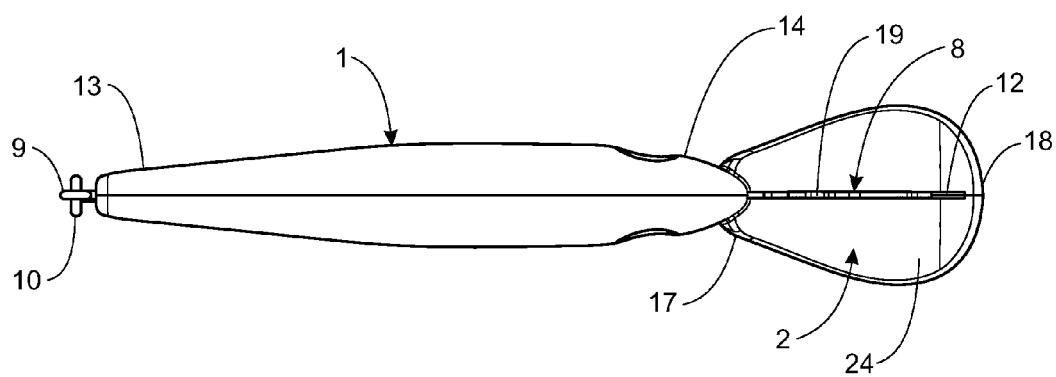
FIG. 8 is a top view of the entire fishing lure device and release hook in the engaged position resting within the slot that bisects the diving bill laterally from near the front end to the rear end of the diving bill.

Referring to FIG. 8, an oblong fishing lure body 1 is illustrated having a front or head portion 14, a rear or tail portion 13, an eyelet 9 attached to the rear or tail portion 13, and a fish hook 10 attached to the eyelet 9. The diving bill 2 has a top surface 24 that defines the diving plane, a rear end 17 that attaches to front or head portion 14 of the fishing lure body 1, and front end 18 that defines the leading edge of the fishing lure when pulled through the water. A release hook 8 is pivotably mounted near the front end 18 of the diving bill 2. A slot 12 exactly bisects the diving bill 2 from near the front end 18 to the rear end 17. The release hook 8 rests within the slot 12 and is flush with the top surface 24 of the diving bill 2.

What is claimed is:

1. A fishing lure having a built-in, spring-loaded, adjustable diving and release apparatus that allows an elimination of a diving plane when a release event occurs that would cause a disengagement of the apparatus built into the diving bill, said fishing lure comprising:
   a diving bill extending outwardly from a front portion of an oblong shaped fishing lure body and angled downwardly from a longitudinal axis of the fishing lure body, the bill having a top surface that defines the diving plane, a rear end, a front end, a rounded underside defining a cylinder shaped cavity, wherein a slot bisects the top surface of the diving bill where it intersects the cylinder shaped cavity in the underside of the diving bill;
   within said cylinder shaped cavity is assembled a release apparatus configured for engaging and holding in position a release hook;
   the release hook pivotably mounted near the front end of the diving bill within the slot by a proximal end pivoting on a metal pin; and having a hook-shaped end on a distal end of the release hook and defining an eyelet in the top surface of the release hook, the eyelet configured for attachment of a fishing line,
   wherein when said release hook is engaged with the adjustable release apparatus, and pulled through water by attachment to the fishing line, the diving bill creates a diving plane, sending the fishing lure below a surface of the water, and
   wherein when said release hook is disengaged from a catch apparatus, it moves upward and forward around the metal pin until its hook shaped end extends upward and forward toward the front end of the diving bill, altering an attack angle of the diving plane and causing the lure to ascend to the surface of the water, or be retrieved by the fisherman more easily;
   the release apparatus comprises: a release hook, a ball, a spring, a set screw and a threaded insert with a matching thread pattern with that of the set screw, wherein said ball, spring, set screw and threaded insert rest within the cylinder shaped cavity within a cylinder shaped underside of the diving bill and are angled upward toward a rear end and top surface of the diving bill; wherein the ball rests in the rear of the cylinder shaped cavity near the rear end of the diving bill and intersects the slot that bisects the top surface of the diving bill; the spring is compressed between the ball and the set screw which is mounted inside the threaded insert at a front opening of the cylinder shaped cavity within the cylinder shaped underside of the diving bill;

wherein said set screw, when turned clockwise, compresses the spring, applying pressure on the ball; and wherein, when the set screw is turned counter-clockwise, it decompresses the spring, relieving pressure on the ball, and wherein said release hook rests within the slot bisecting the top surface of the diving bill; its proximal end is mounted pivotably near the front end of the diving bill and inside the slot bisecting the diving bill; and its hook shaped end snaps over the ball, with pressure from the spring and set screw, to hold the release hook in the engaged position, and flush with the top surface of the diving bill.

2. A fishing lure comprising:
a. a body;
b. a diving bill extending outward from the body; and
c. an adjustable release apparatus comprising:
  i. an adjustable set screw;
  ii. a ball;
  iii. a spring extending from the adjustable set screw to the ball; and
  iv. a release hook having a hook end releasably engaged with the ball,
    wherein the spring biases the ball to the hook end of the release hook,
    wherein the adjustable release apparatus is contained entirely within the diving bill,
    wherein the release hook is pivotally engaged to the diving bill, and wherein the adjustable set screw adjusts a compression of the spring.

3. The lure of claim 2, wherein the adjustable set screw, the ball, and the spring extend along a plane intersecting a plane of the release hook at an acute angle.

4. The lure of claim 2, wherein the adjustable set screw, the ball, and the spring extend along a plane below the release hook when the release hook is engaged with the adjustable release apparatus and the lure is in use.

* * * * *